Feb. 14, 1967 A. J. BARACKET 3,304,493

TELEVISION AND RADAR FREQUENCY RESPONSE TESTING APPARATUS
HAVING A KEYED OSCILLATOR

Filed Sept. 24, 1963

INVENTOR
ALBERT J. BARACKET

BY

ATTORNEYS

United States Patent Office 3,304,493
Patented Feb. 14, 1967

3,304,493

TELEVISION AND RADAR FREQUENCY RESPONSE TESTING APPARATUS HAVING A KEYED OSCILLATOR

Albert J. Baracket, Lancaster, Ohio, assignor to Diamond Power Specialty Corporation, Lancaster, Ohio, a corporation of Ohio Filed Sept. 24, 1963, Ser. No. 311,170
7 Claims. (Cl. 324—57)

This invention relates to a simple method of making measurements of the frequency response of electronic circuits and apparatus, particularly television and radar circuits and apparatus, including cathode ray display tubes used in such apparatus. The invention also relates to apparatus, including a keyed oscillator, for producing bursts of oscillation, each starting with the same phase relationship and therefore especially suited for carrying out the novel method of this invention.

One of the problems encountered in measuring the frequency response of television circuits is that the television signal is broken up at evenly spaced intervals of time by synchronizing and blanking impulses during which time the signal is normally returned to a predetermined fixed voltage level. If a variable frequency signal is applied to signal input terminals of a television circuit in order to measure the frequency response, and if synchronizing or blanking signals are also applied to the circuit, the variable frequency signal will have a stationary time relationship with respect to the synchronizing signal only when the frequency of the applied signal is a multiple of the basic synchronizing frequency. For all other frequencies it will be difficult to produce on the face of a cathode ray an intelligible pattern of the combined synchronizing and variable synchronizing signal. Even if the synchronizing signal is removed, the applied testing signal must pass through the same amplifiers in order to perform a meaningful test of the apparatus, and certain of these amplifiers in the usual case will include clamping circuits which, as is well known, cause the signal level to return to a predetermined value at regular intervals, which are normally the synchronizing signal intervals. Heretofore, it has been the custom to disconnect the clamping circuits when testing such apparatus, but this is not satisfactory because frequently it is the clamping circuits themselves that are at fault and need to be tested. This problem exists in testing radar circuits as well as television circuits.

Beyond the electronic circuits themselves it is also desirable in both television and radar apparatus to test the uniformity of focus of the electron beam over the face of the cathode ray tube on which the picture is displayed. Instead of making measurements with the cathode ray beam stationary, the present invention includes provisions for making dynamic tests with the beam in motion.

In accordance with the present invention a suitable testing signal is provided by generating groups of electrical oscillations each of which begins with the same phase condition. These groups of oscillation are timed by means of a synchronizing or a blanking signal, and they normally begin shortly after the termination of each synchronizing or blanking signal. Thus, no matter what the frequency of the oscillations may be, they always produce stationary patterns on the face of a cathode ray tube that is synchronized by means of the very signal that controls the beginning of each of the bursts of oscillations. The frequency of the oscillations in each burst may be increased to the point at which the amplification of the television system beings to fall off or falls off to a predetermined extent, and this point may be noted and compared with a standard. Furthermore, in testing television systems if the bursts of oscillations are applied to intensity-controlling electrodes of a television picture tube the cathode ray beam of which is deflected in accordance with the synchronizing signal that governs the timing of the initiation of each of the bursts, a series of stationary straight lines will be presented on the face of the cathode ray tube. The straightness of the lines and the uniformity of spacing between them may be used as a measure of the quality of the deflection circuits while the intensity of the lines forms a visible means of determining the amplification of the signal passing through television system. It has been found that when the frequency of oscillations in the bursts is increased to a sufficiently high value, the intensity of illumination produced on the face of the cathode ray tube decreases rather suddenly and gives a clear indication of the high frequency limit of the television system. Moreover, inspection of the pattern on the face of the cathode ray tube as the frequency of oscillation in the bursts is increased will indicate the frequency at which the individual lines merge together into a uniform pattern of illumination. This point will be a measure of the diameter of the cathode ray beam and hence a measure of the quality of its focus. It will be noted in actual practice that the frequency at which the lines merge is not the same for all parts of the screen of the picture tube since normally the cathode ray beam is better focused in some areas of the tube than other areas. This is one of the quality factors of a cathode ray tube and is easily measured by making the dynamic test just described but may not even exist for static tests.

The tests described in connection with television apparatus are substantially the same for radar apparatus except for the fact that in plan position indictor display devices the scan is normally in the form of concentric circles rather than straight lines. However, it is just as essential that these circles remain stationary while being viewed as that the straight lines on a television picture tube remain stationary. An additional complicating factor in radar systems is the fact that the radar pulse that acts as synchronizing signal is normally of very short duration. This requires that the pulse be lengthened in order to provide effective control of the beginning of each of the bursts of oscillations.

The novel apparatus of this invention comprises an oscillator capable of producing bursts of oscillations having a wide frequency range, and also capable of starting and stopping substantially instantaneously. A particular form of oscillator that I have found especially suitable is a phase-shift oscillator which uses only resistors and capacitors as the frequency determining elements. This oscillator is connected to a keying circuit to be controlled thereby and the keying circuit in turn is connected to a synchronizing signal source which may either be a television signal generator or a radar signal generator to provide the proper type of keying for the oscillator. The apparatus also includes a pulse lengthening circuit for use when the apparatus is connected to a radar signal generator. The outut signal is suitable for connection to either a television system or to radar apparatus or even, by way of an amplifier, to a cathode ray tube which is to be measured.

The invention will be described in greater detail in connection with the drawings in which.

Figures 1, 2, 3, 4, 5:
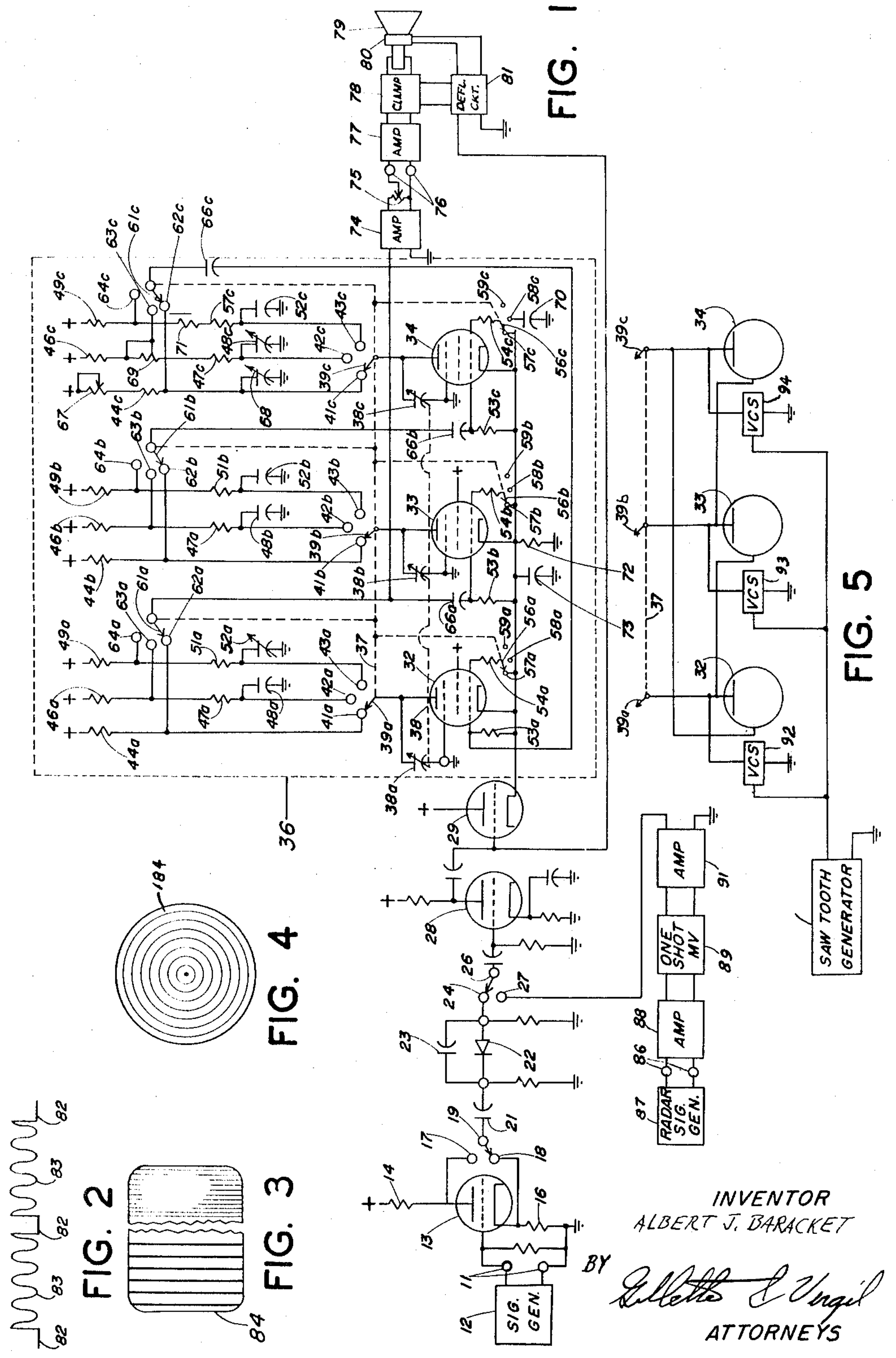
FIG. 1 shows a schematic circuit, partly in block form, of the apparatus of this invention, together with signal generators and the apparatus to be measured.
FIG. 2 is a waveform diagram of the basic signal generated by the circuit of FIG. 1.
FIG. 3 shows the face of a television picture tube energized by oscillations of different frequencies.
FIG. 4 shows a radar display tube energized by an electrical signal corresponding to the signal shown in FIG. 2.
FIG. 5 shows a modification of FIG. 1.

The measuring apparatus of FIG. 1 will first be described as it is used for measuring the response of television apparatus and television picture tubes. For this purpose the measuring apparatus is provided with a pair of input terminals 11 for connection to a television signal generator 12. In practice it may be desirable to provide more than one pair of input terminals for connection to different output signal terminals of a television signal generator, such as the synchronizing signal terminals, the driving signal terminals, or the blanking signal terminals. Basically, however, there is no difference between these various impulse-type signals as they apply to the present invention since any of them may be used for the purpose of synchronizing the oscillator of the apparatus with which the invention is concerned.

The input terminals 11 are connected to a paraphase amplifier 13 which has anode and cathode loads 14 and 16, respectively, of substantially equal resistance to provide signals corresponding to the signal applied to the input terminals 11 but of both positive and negative polarities, one at terminal 17 and the other at terminal 18 of a switch 19. Subsequent circuits in the measuring apparatus are arranged so that they require negative-going impulses for proper operation and the paraphase amplifier 13, together with the switch 19, makes it possible to supply the required negative-going pulse signal even if the only available output signal from the generator 12 is of the wrong polarity.

The arm of the switch 19 is connected through a capacitor 21 to a rectifier 22 which is bypassed by small capacitor 23, and the output of the recifier 22 is connected to one terminal 24 of a switch 26. The other terminal 27 of the switch 26 is connected to circuits which are used only in measuring radar systems. These will be described hereinafter.

The arm of the switch 26 is connected to the input of an amplifier 28 which amplifies the signal applied to it and connects it to a keying circuit comprising a cathode follower amplifier 29. The latter is connected to a common cathode load resistor 72 shared by the tube 29 and three tubes 32–34 of a phase-shift oscillator 36. One of the advantages of a phase-shift oscillator is that the frequency at which it oscillates is determined by resistors and capacitors and not by inductances, and the oscillations therefore may be started and stopped substantially instantaneously. The phase-shift oscillator 36 comprises basically three amplifiers connected in a closed series circuit so that a suitable signal voltage applied to the first amplifier will be amplified therein and passed on to the second amplifier and from there to the third amplifier and back to the first amplifier. By suitable resistance-capacitance coupling circuits between the three amplifiers their operation may be such that for given parameters of resistance and capacitance, only a single frequency may be transmitted around the whole ring and, in fact, the ring will oscillate at this single frequency. Changing the parameters changes the frequency.

More explicitly, oscillator 36 comprises a range setting switch 37 connected to resistors that determine whether the oscillator operates in high, medium and low ranges of frequencies and a multisection capacitor 38 that adjusts the frequency of the oscillator 36 within each range. While the exact limits of each range are to some degree a matter of choice, I have found it desirable to select the parameters so that in the low range the oscillator operates from a low frequency of approximately 20 kilocycles to approximately 200 kilocycles and in the medium range from approximately 200 kilocycles to 2 megacycles and in the high frequency range from approximately 2 megacycles to 20 megacycles. In each case the frequency is adjusted from the low and high limits of the range by rotation of the capacitor 38 from its highest to its lowest capacitance.

The first section of the oscillator comprising those components connected to the first tube 32 includes section **38*a* of the capacitor 38. As mentioned, this section is connected in series between the plate of tube 32 and ground. Also connected to the plate of tube 32 is an arm 39*a* of the switch 37 which may make contact with any one of three terminals 41*a*, 42*a*, or 43*a*. These three terminals correspond respectively to the high, medium and low frequency ranges of operation of the oscillator. In the drawing the arm 39*a* happens to be connected to terminal 41*a* which is connected to the plate load resistor 44*a* which, in turn, is selected to have the proper resistance to operate the oscillator in its high frequency range. The plate load for medium frequency operation comprises resistors 46*a* and 47*a* connected in series and padding capacitor 48*a* connected between ground and the junction of load resistor 47*a* and the medium frequency terminal 42*a*. The low-frequency plate load comprises resistors 49*a* and 51*a* connected in series to the low-frequency terminal 43*a*. A padding capacitor 52*a* is connected between ground and the junction of terminal 43*a* and load resistor 51*a*, and is in parallel with section 38*a* of the main tuning capacitor when the arm 39*a* of the switch 37 is connected to terminal 43*a*. The feed back signal to the tube 32 is applied by way of the control grid and is across at least one grid resistor 53*a*. In addition, there is a second grid resistor 54*a* which is connected to an arm 56*a* of the switch 37. The arm 56*a* may be switched to any one of three terminals 57*a*, 58*a*, or 59*a* which correspond, respectively, to the high, medium, and low frequency ranges of operation. Only terminal 57*a*, the high frequency terminal, is connected to the common cathode line, the other two terminals 58*a* and 59*a* being unconnected. The output signal of the first stage tube 32 includes an arm 61*a* of the switch 37 and three terminals 62*a*, 63*a*, and 64*a* which are connected, respectively, to the load resistors 44*a*, 46*a* and 47, and 49*a* and 51*a***.

The arm **61*a* is connected by way of a coupling capacitor 66*a* to the control grid of the second tube 33, which is connected in a circuit identical to the circuit of tube 32 so that a detailed description need not be repeated. The resistors and capacitors connected to tube 33 are identified by the same reference numerals as similar ones connected to tube 32**, except that the letter *b* has been used instead of the letter *a*.

The third tube 34 is connected to a similar circuit except that several trimming elements have been added to adjust the frequency ranges of the oscillator 36 precisely. Circuit elements which are connected to tube 34 but which are substantially identical with circuit elements connected to tubes 32 and 33 are identified by the same reference numerals, except that the letter *c* has been used in place place in the letters *a* or *b*. The trimming elements for adjusting the high frequency range include a resistor 67 which is connected in series with the high frequency plate load resistor **44*c* and which is adjustable to vary slightly the precise plate load impedance for setting the low frequency limit of the high frequency range, and an adjustable capacitor 68 connected between the resistor 44*c* and ground to set the high frequency limit of the high frequency range. For adjusting the low frequency limit of the medium frequency range, a resistor 69 is connected between the medium frequency load resistors 46*c* and 47*c*, and for setting the high frequency limit the capacitor 48*c* is made adjustable and a small capacitor 70 is connected from terminal 58*c* to ground. Finally, for adjusting the low and high frequency limits of the low frequency range, a variable resistor 71 is connected between the low frequency load resistors 49*c* and 51*c* and the capacitor 52*a*** is made adjustable.

The coupling capacitor **66*c* connects the output signal to the third stage tube 34** back to the input of the first stage tube 32, and a common resistor 72 and capacitor 73 are connected between the cathodes of tubes 32–34 and ground. The output signal of the oscillator is derived from the arm 61*a* of the first stage and is applied to a buffer amplifier 74. The amplitude of the output signal of the buffer amplifier 74 may be adjusted by a potentiometer 75 to provide a signal of predetermined amplitude at the output terminals 76 of the circuit.

This output signal is suitable for connection to any television circuit which it may be desired to measure. One example of such a circuit is shown in block form and includes an amplifier 77 and a clamping circuit 78 which returns the output signal of the amplifier 77 to a fixed clamping level during each blanking pulse. The clamp output signal is applied to intensity-modulating electrodes of a cathode ray tube 79 which has deflection means, such as a yoke 80, to deflect the cathode ray beam in a pattern across the face of the tube 79. Suitable signals for operating the clamping circuit 78 and the deflection yoke 80 may be derived from a standard circuit 81, the input of which is connected back to the input of tube 29 so as to receive the repetitive impulses that are applied to the keying tube 29 in order that both the clamping and the deflection may correspond in periodicity to the signal that triggers the operation of the oscillator 36.

The waveform of the output signal of the clamping circuit 78 is shown in FIG. 2 and consists of a clamped portion 82, which is repeated at regular intervals of time and during which the level of the signal is brought to a fixed voltage, and a series of oscillations 83, the frequency of which is determined by the setting of parameters of the oscillator 36. However, it is to be noted that each of the series of oscillations begins with the same phase relationship so that the waveform from the beginning of each of the blanking pulses 82 to the beginning of the succeeding blanking interval pulse is identical from pulse to pulse, thus generating on the face of the cathode ray tube 79 a fixed pattern. If the deflection of the cathode ray is such as to cause the waveform of FIG. 2 to be traced out, that waveform will remain constant, as a whole, whereas, if the oscillator 36 were not keyed by the pulse signal, each group of oscillations 83 would begin with a different phase condition, and either the pulses 82 or the oscillations 83 could be made to appear stationary on the face of the tube 79, but not both. Having the whole pattern remain stationary facilitates measurement of the amplitude of the oscillations 83. By varying the frequency of the oscillator 36, it is a simple matter to determine precisely the frequency response of both the amplifier 76 and the clamping circuit 78, even where the ratio of the maximum frequency of the oscillations 83 to the repetition rate of the pulses 82 is 1500:1.

In addition, the same circuit arrangement may be used to measure the spot size, or cathode ray beam diameter of the tube 79. By causing the cathode ray beam in the tube to follow a regular rectangular television raster, the signal of FIG. 2 will generate on the face of the tube 79 a pattern as indicated in FIG. 3. FIG. 3 shows left and right hand sections of the face 84 of the cathode ray tube 79 under different applied oscillations. In the left hand section of the cathode ray tube face 84, relatively low frequency oscillations are depicted. Because these oscillations begin with exactly the same phase condition, they generate vertical lines on the tube face 84, even though the cathode ray beam is deflected across in substantially horizontal lines. Because the oscillations 83 in the left hand section of the FIG. 3 are relatively low in frequency, the pattern that results is a pattern of alternate dark and light stripes generated by the modulation of intensity of the cathode ray beam between the cutoff, or zero intensity, level of the beam and a level of substantial brightness.

In the right hand section of FIG. 3 the oscillations applied to the tube are much higher in frequency so that the vertical lines are close together. By adjusting the frequency of the oscillator 36, the spacing between the lines on the face 84 may be brought closer and closer together, and, under the conditions shown in the right hand section of FIG. 3, the lines are so close together that, in the upper right hand corner, they have merged into an area of uniform illumination. This indicates that in that corner the spacing between the lines is less than the width of the cathode ray beam and is one measure of the quality of focus of the tube 79. Under the best possible conditions the lines would remain individually visible over the entire face 84 until some frequency was reached at which all of the lines would disappear simultaneously over the entire face of the tube. It is desirable to be able to measure how far the actual tube and circuits depart from this ideal and by noting the frequency to which the oscillator 36 must be tuned in order to produce an area of uniform illumination and, by noting where this area appears and whether it is localized or extends over a large part of the tube, a measurement of the quality of the tube and the focusing circuits is achieved. It should be understood of course that where it is desired to measure only the quality of focus over the face 84, the cathode ray tube 79 may be connected directly to the terminals 76 without the necessity of providing the clamping circuit 78.

While the frequency response of the amplifier 77 and the clamping circuit 78 may be measured by applying the output signal of the connecting circuit to a cathode ray oscillograph to observe the waveform indicated in FIG. 2, a sufficiently accurate measurement may be made by using the circuit exactly as shown in FIG. 1 and simply increasing the frequency of the oscillator 36 until a point is reached at which the pattern on the face 84 begins to grow dim. Normally the brightness of the pattern on the face 84 is relatively constant below this frequency but drops so sharply above this frequency as to indicate the limiting frequency itself quite accurately.

Where it is desired to measure the quality of radar apparatus, it may be preferable to provide separate input terminals 86 for connection to a radar signal generator 87. As is well known, radar signal generators provide repetitive pulses of very short duration, and the reason for connecting these pulses to different input terminals from the terminals 11 to which television signals are connected is that these short duration pulses may need to be lengthened in order to operate the oscillator 36 properly. The pulse lengthening circuit includes an amplifier 88 connected to the terminals 86, and a one-shot multivibrator 89 connected to the amplifier 88 to receive the pulse signals therefrom. The multivibrator is triggered into operation by each of these pulses and produces, at its output, pulses of the same frequency but longer duration. These pulses are then applied to a second amplifier 91, the output signal of which is connected to the terminal 27 of the switch 26. The lengthening pulses applied to this terminal are suitable for controlling the oscillator 36 and thereafter operation of the circuit is the same as has been described herein before.

As is well known, radar plan position indicators include a cathode ray tube and means for deflecting the cathode ray beam radially from the center of the faceplate over the tube each time one of the radar pulses occurs. The deflection means are adjusted so that a different radial direction is selected for each deflection according to the direction in which the antenna of the radar system is pointed.

FIG. 4 shows the faceplate of a radar tube which is indicated by a reference character 184 and which may be connected exactly as the tube 79 shown in FIG. 1. However the deflection means for radar operation will normally be somewhat different from the standard circuit 81 and the yoke 80 but it is unnecessary to describe the deflection means and circuit in detail since they are well known. By applying the output signal of the oscillator 36 to the intensity-modulating electrodes of a radar tube, a series of concentric stationary circles will be produced on the faceplate 184. The spacing between these circles is determined by the frequency of the oscillations and the resolution capacity of the radar apparatus will be measured by the frequency at which the individual circles begin to lose their identity as the frequency of the oscillator 36 is increased. In addition to measuring the quality of focus of the cathode ray beam over the faceplate 184 of the radar tube, the apparatus of FIG. 1 also indicates the maximum frequency of operation of the radar amplifiers which are connected exactly as amplifiers 77 in FIG. 1. As the frequency of the oscillator 36 is increased, a point will be reached at which amplification of the radar amplifier falls off rather rapidly. When the frequency of the oscillator is increased beyond this point, the pattern on the faceplate 184 suddenly grows quite dim. This is another measurement of the resolution capacity of the radar system and is independent of the resolution capacity limitation caused by the quality of focus of the cathode ray beam itself.

While the three-section capacitor 38 may be tuned by hand and left at fixed positions as may be required to produce any desired oscillating frequency within the capability of the instrument of FIG. 1, it is also to be understood that the capacitor 38 may be motor-driven so as to run automatically through its capacity range, thus tuning the oscillator 36 repetitively through any selected one of its bands as determined by the position of the switch 39.

As an alternative means for tuning the oscillator 36 continuously and particularly where it is desired to tune the oscillator through its entire range in a shorter interval of time, this may be done by a motor-driven capacitor. FIG. 5 shows a variation of the phase-locked oscillator 36 of FIG. 1. In FIG. 5 three variable capacity diode semiconductors 92, 93 and 94 are connected, respectively, to the three oscillator tubes 32, 33 and 34 in place of the three section capacitor 38. These variable capacity semiconductors are characterized by a capacitance which changes with the instantaneous amplitude of the signal applied to them. By applying a signal from a sawtooth generator 96 to the variable capacity semiconductors 92–94, the capacitances may be changed at a rate determined by the repetition rate of the saw to the signal produced by the generator 96. This generator may include the signal generator 12 of FIG. 1, so that the repetition rate of the sawtooth signal may be equal to the horizontal repetition rate of a television signal or to any other convenient rate such as may be required in measuring radar circuits. It is to be understood that the three tubes 32, 33 and 34 are to be connected as shown in FIG. 1, except for the semiconductors 92–94 in place of the capacitor 38, and that the basic frequency-determining elements of FIG. 1 would be used in the circuit of FIG. 5. The rate of change of frequency with respect to time may be made linear, if desired, by operating the semiconductors 92–94 over a linear portion of their characteristic range or, if necessary, by suitably distorting the output signal of the sawtooth signal generator 89.

While this invention has been described in terms of a specific embodiment, it will be understood by those skilled in the art that modifications may be made therein. In particular, it will be understood that the vacuum tubes may be replaced by other active elements, such as transistors. The true scope of the invention is to be measured by the following claims.

What is claimed is:

1. Measuring apparatus comprising: an oscillator; a keying circuit connected to said oscillator; means connected to said keying circuit to supply a control signal thereto to drive said keying circuit from a first operating condition to a second, said keying circuit controlling the operation of said oscillator to make said oscillator quiescent when said keying circuit is in one of its operating conditions and to make said oscillator begin oscillating at the same relative phase condition each time said keying circuit is driven to the other of its operating conditions; means connecting said oscillator to electronic apparatus including a cathode ray tube to receive the repeated series of oscillations and to render the same visible; and deflection means connected to said first-named means to be controlled thereby to deflect the cathode ray beam to produce a repetitive pattern in fixed position.

2. Measuring apparatus comprising: an oscillator; a keying circuit connected to said oscillator; means connected to said keying circuit to supply a control signal thereto to drive said keying circuit from a first operating condition to a second, said keying circuit controlling the operation of said oscillator to make said oscillator quiescent when said keying circuit is in one of its operating conditions and to make said oscillator begin oscillating at the same relative phase condition each time said keying circuit is driven to the other of its operating conditions; means connecting said oscillator to electronic apparatus to be tested including a cathode ray tube, said cathode ray tube having intensity-controlling electrodes connected with said apparatus to receive the repeated series of oscillations therefrom to modulate the cathode ray beam, and a fluorescent screen to render the same visible; and deflection means connected to said first-named means to be controlled thereby to deflect the cathode ray beam to produce a repetitive pattern of modulated intensity in fixed position.

3. The measuring apparatus of claim 2 in which said deflection means comprises horizontal and vertical deflection means to deflect said cathode ray beam according to a television raster, and in which said repetitive pattern comprises a series of stationary vertical lines.

4. Measuring apparatus comprising: a variable-frequency oscillator; a keying circuit connected to said oscillator; means connected to said keying circuit to supply a control signal thereto to drive said keying circuit from a first operating condition to a second, said keying circuit controlling the operation of said oscillator to make said oscillator quiescent when said keying circuit is in one of its operating conditions and to make said oscillator begin oscillating at the same relative phase condition each time said keying circuit is driven to the other of its operating conditions; means connecting said oscillator to electronic apparatus to be tested, including a cathode ray tube to receive the repeated series of oscillations and to render the same visible; deflection means connected to said first-named means to be controlled thereby and connected to said cathode ray tube to deflect the cathode ray beam to produce a repetitive pattern in fixed position; and means for varying the frequency of operation of said oscillator to a frequency at which the pattern on said cathode ray tube reduces in intensity.

5. Measuring apparatus comprising: a variable-frequency oscillator; a keying circuit connected to said oscillator; means connected to said keying circuit to supply a control signal thereto to drive said keying circuit from a first operating condition to a second, said keying circuit controlling the operation of said oscillator to make said oscillator quiescent when said keying circuit is in one of its operating conditions and to make said oscillator begin oscillating at the same relative phase condition each time said keying circuit is driven to the other of its operating conditions; means connecting said oscillator to electronic apparatus including a cathode ray tube having intensity modulating electrodes to receive the repeated series of oscillations and a fluorescent screen; deflection means connected to said first-named means to be controlled thereby and connected to said cathode ray tube to deflect the cathode ray beam to produce on said screen a repetitive pattern of lines in fixed position; and means for varying the frequency of operation of said oscillator to a frequency at which the lines on said cathode ray tube merge into an area of substantially uniform illumination in an area of said screen.

6. Measuring apparatus comprising: an oscillator; a keying circuit connected to said oscillator; means connected to said keying circuit to supply a control signal thereto to drive said keying circuit from a first operating condition to a second, said keying circuit controlling the operation of said oscillator to make said oscillator quiescent when said keying circuit is in one of its operating conditions and to make said oscillator begin oscillating at the same relative phase condition each time said keying circuit is driven to the other of its operating conditions; electronic apparatus comprising a clamping circuit; means connecting said oscillator to electronic apparatus to be tested; a cathode ray tube having intensity-controlling electrodes connected with said apparatus to receive the repeated series of oscillations therefrom to modulate the cathode ray beam, and a fluorescent screen to render the same visible; deflection means connected to said first-named means to be controlled thereby to deflect the cathode ray beam to produce a repetitive pattern of modulated intensity in fixed position; and means to vary the frequency of said oscillator from a relatively low frequency, at which said pattern has a certain intensity to a higher frequency at which the intensity of said pattern is reduced.

7. Measuring apparatus comprising: a phase shift oscillator; a keying circuit connected to said oscillator; a control circuit connected to said keying circuit to render said keying circuit alternately conducting and nonconducting; said keying circuit rendering said oscillator operative when said keying circuit is nonconductive, whereby said oscillator begins each period of oscillation with the same relative phase condition; electronic apparatus to be measured, said apparatus comprising a clamping circuit connected to said oscillator to transmit oscillations therefrom; a cathode ray tube having intensity controlling electrodes connected to said apparatus to receive electrical oscillations that have passed through said clamping circuit; said last-named oscillations modulating the cathode ray beam in said cathode ray tube, said tube having a fluorescent screen to render the modulated cathode ray beam visible as a pattern thereon; and deflection means connected to said control circuit to deflect the cathode ray beam to produce a fixed repetitive pattern on said screen.

No references cited.

WALTER L. CARLSON, *Primary Examiner*.

E. E. KUBASIEWICZ, *Assistant Examiner*.